United States Patent [19]

Chandra

[11] Patent Number: 4,725,787
[45] Date of Patent: Feb. 16, 1988

[54] PHASE-CONJUGATED HYBRID SLAB LASER

[75] Inventor: Suresh Chandra, Fairfax County, Va.

[73] Assignee: The United States of America as represented by the Secretary of the Army, Washington, D.C.

[21] Appl. No.: 948,252

[22] Filed: Dec. 31, 1986

[51] Int. Cl.$^4$ .................. H01S 3/06; H01S 3/093; H01S 3/23
[52] U.S. Cl. ....................... 330/4.3; 372/27; 372/66; 372/71; 372/98
[58] Field of Search ............ 372/69, 71, 72, 98, 372/99, 66, 97, 92, 27; 330/4.3

[56] References Cited

U.S. PATENT DOCUMENTS 4,344,042  8/1982  Hon ....................... 330/4.3
4,682,340  7/1987  Dave et al. ............... 372/99

OTHER PUBLICATIONS

Chandra; "Sidearm Stimulated Scattering Phase-conjugated Laser Resonator"; Optics Letters, vol. 10, pp. 356-358, Jul. 1985.

Primary Examiner—James W. Davie
Assistant Examiner—Xuan Vo
Attorney, Agent, or Firm—Max L. Harwell; Aubrey J. Dunn; Anthony T. Lane

[57] ABSTRACT

A relatively low-power but high-quality laser oscillator is coupled to a high-power laser amplifier. The amplifier includes a rectangular slab of laser active material, and a phase-conjugate end mirror.

11 Claims, 1 Drawing Figure

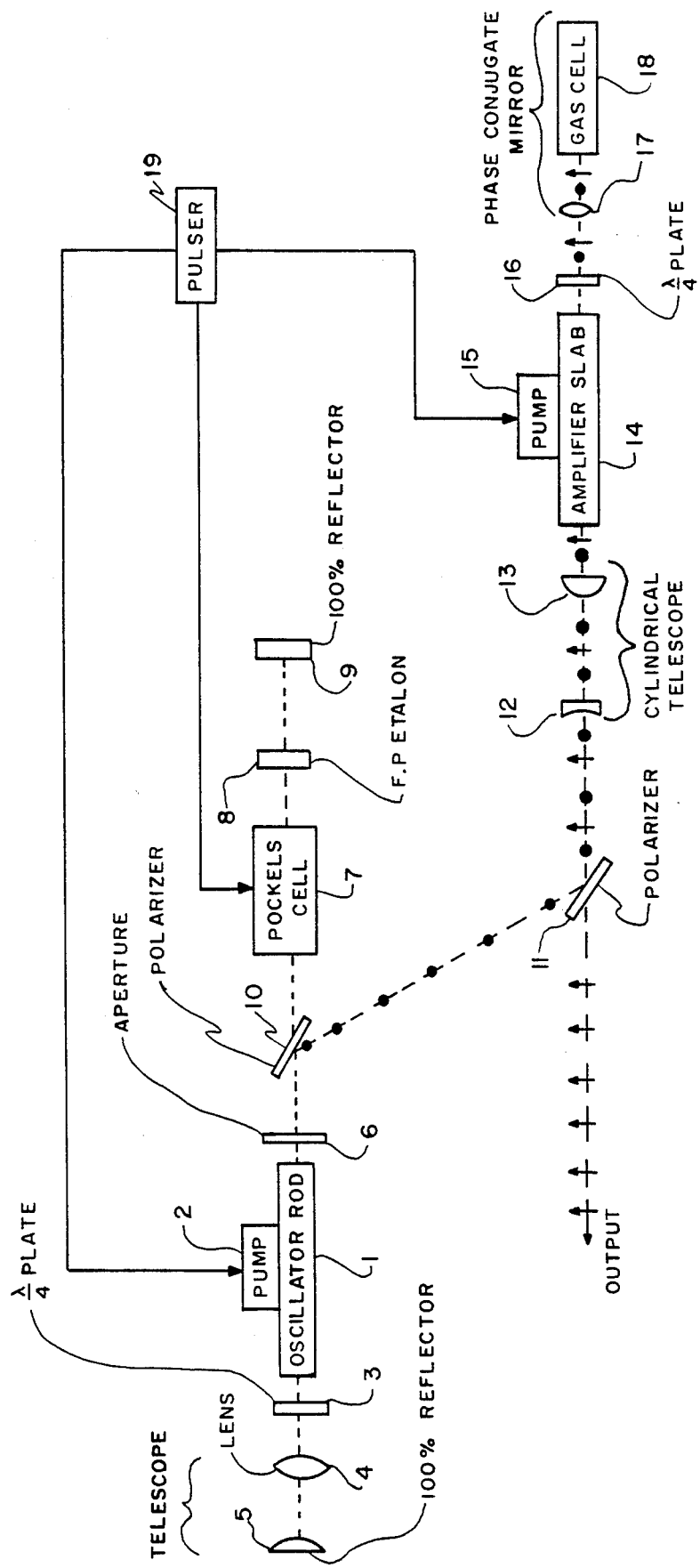

PHASE-CONJUGATED HYBRID SLAB LASER

The invention described herein may be manufactured, used, and licensed by the U.S. Government for governmental purposes without the payment of any royalties thereon.

BACKGROUND OF THE INVENTION

The invention is in the field of solid state high-power lasers. In most solid-state lasers, the lasing material is fabricated in the shape of round cylindrical rods. Lasers based on such rods provide a simple and low-cost means for obtaining laser output at low power levels. However, at high power levels, such rods exhibit serious limitations because of thermal lensing and thermal birefringence. Mild thermal lensing at a given power level can be corrected by using a compensating lens in the cavity. A more perfect and dynamic aberration correction has been achieved by using the technique of optical phase conjugation, usually based on stimulated scattering. Thermal birefringence of laser rods, however, remains a major problem. In round rods, the birefringence varies quadratically with radius and total compensation for it is very difficult. This imposes a limitation when a large volume of gain medium is needed. Round rods are, therefore, basically upward scalable only along one dimension, namely, length. Several years ago, General Electric Corporation made a major stride in overcoming thermal limitations of rod lasers by introducing the slab laser geometry with a zigzag beam path. The gain medium is fabricated in the form of a rectangular cross-section slab with relatively large parallel surfaces or faces parallel to the slab length. The laser beam is introduced into the slab through an end face cut at Brewster's angle. The beam then propagates through the slab in a zigzag path while undergoing total internal reflection at the large slab faces. Since the slab is rectangular and is pumped through and cooled from the large faces, the temperature gradient is one dimensional and the birefringence is X—Y type. There is no beam depolarization for a laser beam polarized for Brewster's angle. This contrasts sharply with the beam depolarization because of radial birefringence of a round rod. The zigzag path through the slab is effective in averaging out potential wavefront distortions caused by thermal lensing effects. Also, unlike round rods, the slab geometry allows scaling along two different dimensions, namely, the width and length. An increase in the width dimension of the slab can be made without increasing the distance between the hottest middle part and the cooled surfaces. In spite of its many attractive advantages, the GE zigzag slab laser suffers from several disadvantages. These disadvantages can be listed as follows: (1) Incomplete energy extraction because the zigzaging beam does not fill the active slab volume, (2) beam wander because of thermally induced slab bending, (3) sealing difficulties since the zigzaging laser beam directly strikes the large faces where the coolant seals are made, (4) the large slab faces must be kept optically clean, (5) the cost and difficulty of polishing large slab faces to exacting optical tolerances. The present invention overcomes those disadvantages by operating in a hybrid manner, i.e., it combines the best features of round rod and slab technologies.

SUMMARY OF THE INVENTION

A high-power laser including a high-quality, low power laser oscillator optically coupled to a high-power phase-conjugated slab amplifier. The beam path through the slab follows a straight path rather than the zigzag path of the GE slab laser as discussed above.

BRIEF DESCRIPTION OF THE DRAWINGS

The single drawing FIGURE is a schematic showing of the invention.

DESCRIPTION OF PREFERRED EMBODIMENT OF INVENTION

The invention may be best understood when this description is taken in conjunction with the drawing. Referring now to the drawing, the invention consists of three major parts: (1) a high-quality laser oscillator, (2) a high-power laser slab amplifier including a phase-conjugate mirror, and (3) means for coupling the output of the oscillator to the amplifier. The oscillator includes oscillator rod 1 of the usual laser materials, pump 2 for pumping this rod, a quarter-wave plate 3 (oriented to make the beam elliptically polarized), the combination of a convergent lens 4 and convex 100% reflecting mirror 5 which form an intercavity telescope (which helps to increase the mode volume for low-order transverse modes), a circular aperture 6 for selecting a low-order transverse mode, a Pockels cell 7 as a Q-switch, a fabry-Perot etalon 8 for reducing the number of axial modes, and a flat 100% mirror 9. Also in the optical cavity of this oscillator, we see polarizer 10 used in conjunction with polarizer 11 to couple the output of the oscillator into the amplifier. The output radiation reflected by polarizer 10 is linearly polarized perpendicular to the plane of the drawing. This radiation is reflected by polarizer 11 through a telescope consisting of lenses 12 and 13. This telescope is a means which expands and shapes the beam to fill the aperture of amplifier slab 14 (pumped by pump 15). After passing through the slab, the laser beam passes through quarter-wave plate 16 and becomes circularly polarized. This circularly polarized beam is reflected from a phase-conjugate mirror consisting of a lens 17 and a gas cell 18 which reflects the beam back by stimulated (Brillouin) scattering. The phase-conjugate reflection does not alter the beam's sense of polarization circulation, so that as it returns through the quarter-wave plate 16, it once again becomes linearly polarized but in the plane of the drawing. The phase-conjugated beam retraces its path exactly back on itself, cancelling out any wavefront distortions it suffered on its first pass through the amplifier, while being further amplified. Upon exiting through the beam shaping optics (12 and 13), the elongated beam cross-section is reduced back to the original circular cross-section of the oscillator beam before it is transmitted through polarizer 11 as the final output laser beam.

The pumping of the lasers and the operation of the Pockels cell is done by pulser 19, which controls the timing of pumps 2 and 15 and the opening of pockels cell 7.

The laser slab in this invention is quite different from the zigzag slab described above in the BACKGROUND OF THE INVENTION. Specifically, only the end faces of the slab are polished and the side surfaces are left rough ground (as with a conventional round laser rod). The laser slab may be characterized as follows: it is a slab with a rectangular cross-section and with a length along a longitudinal axis greater than either orthogonal dimension of the cross-section. The opposite longitudinal ends of the slab are ground and polished essentially flat and parallel and normal to the longitudinal axis, whereas the other sides of the slab are, at most, rough ground. Although not shown, the slab of the invention may be easily cooled in the usual manner, since the beam path is straight and the beam intensity is thus relatively low at the coolant seal. The rectangular slab geometry obviates the problems of radial birefringence just as a zigzag slab does, and the optical phase conjunction of this invention eliminates thermally caused wavefront distortions.

In a model of the invention built to demonstrate its feasibility, some of the details are as follows: lens 4 has a 10 cm focal length, and reflector 5 has a 5 cm radius of curvature. The particular laser slab used was Nd:YAG with 6 mm×20 mm×100 mm dimensions. The 6 mm thickness was chosen for heat dissapation reasons, and the other dimensions were dictated by crystal growth limitations. In the model, instead of the single slab shown and described thus far, I actually used two identical slabs before reaching the phase-conjugate mirror. With the set up described (using two slabs) the oscillator (and output) beam was only 2 mm in diameter. Obviously, this is scalable upwards.

I claim:

1. A phase-conjugated hybrid slab laser comprising:
a laser oscillator portion including pumping means;
a laser amplifier portion including:
  pumping means;
  at least one slab of rectangular cylinder laser material;
  means for circularly polarizing amplified radiation from said slab;
  and a phase-conjugate mirror for retroreflecting the circularly polarized radiation from said means for polarizing back through said means for polarizing and said slab;
means for coupling laser output radiation from said oscillator portion to said amplifier portion;
and means for simultaneously operating said pumping means.

2. The laser as set forth in claim 1 wherein said amplifier portion further includes:
telescope means for expanding and shaping the output radiation from said oscillator portion to fill the rectangular cross-section of said slab.

3. The laser as set forth in claim 1 wherein said oscillator portion includes:
means for limiting said output radiation to radiation with a low order transverse mode.

4. The laser as set forth in claim 1, wherein said means for coupling comprises first and second reflective polarizers, one in each of said oscillator and amplifier portions, whereby linearly polarized radiation is reflected from said oscillator portion to said amplifier portion.

5. The laser as set forth in claim 2, wherein said means for coupling comprises first ans second reflective polarizers, one in each of said oscillator and amplifier portions, whereby linearly polarized radiation is reflected from said oscillator portion to said amplifier portion.

6. The laseer as set forth in claim 3, wherein said means for coupling comprises first and second reflective polarizers, one in each of said oscillator and amplifier portions, whereby linearly polarized radiation is reflected from said oscillator portion to said amplifier portion.

7. The laser as set forth in claim 1, wherein said slab is rectangular in cross-section and has a length greater than either orthogonal dimension of said cross-section, and whereby opposite longitudinal ends of said slab are essentially flat and parallel and normal to a longitudinal axis of the slab.

8. The laser as set forth in claim 2, wherein said slab is rectangular in cross-section and has a length greater than either orthogonal dimension of said cross-section, and whereby opposite longitudinal ends of said slab are essentially flat and parallel and normal to a longitudinal axis of the slab.

9. The laser as set forth in claim 3, wherein said slab is rectangular in cross-section and has a length greater than either orthogonal dimension of said cross-section, and whereby opposite longitudinal ends of said slab are essentially flat and parallel and normal to a longitudinal axis of the slab.

10. The laser as set forth in claim 4, wherein said slab is rectangular in cross-section and has a length greater than either orthogonal dimension of said cross-section, and whereby opposite longitudinal ends of said slab are essentially flat and parallel and normal to a longitudinal axis of the slab.

11. The laser as set forth in claim 5, wherein said slab is rectangular in cross-section and has a length greater than either orthogonal dimension of said cross-section, and whereby opposite longitudinal ends of said slab are essentially flat and parallel and normal to a longitudinal axis of the slab.

* * * * *